United States Patent
Horie et al.

[11] Patent Number: 6,095,114
[45] Date of Patent: Aug. 1, 2000

[54] GASOLINE DIRECT-INJECTION ENGINE

[75] Inventors: Kaoru Horie; Masaki Takayama; Hitoshi Takahashi; Hiromi Matsuura; Susumu Nakajima; Naoaki Takeda; Mitsuharu Imaseki, all of Wako, Japan

[73] Assignee: Honda Giken Kogyo Kabushiki Kaisha, Tokyo, Japan

[21] Appl. No.: 09/304,993

[22] Filed: May 4, 1999

[51] Int. Cl.[7] .................................................. F02R 17/00
[52] U.S. Cl. ........................................ 123/298; 123/305
[58] Field of Search ................................... 123/295, 298, 123/305, 668

[56] References Cited

U.S. PATENT DOCUMENTS

| | | | |
|---|---|---|---|
| 4,286,557 | 9/1981 | Klomp | 123/298 |
| 4,480,620 | 11/1984 | Tange et al. | 123/295 |
| 5,335,635 | 8/1994 | Kadoi et al. | 123/295 |
| 5,373,820 | 12/1994 | Sakamoto et al. | 123/298 |
| 5,605,125 | 2/1997 | Yaita | 123/298 |
| 5,813,385 | 9/1998 | Yamauchi et al. | 123/295 |
| 5,927,244 | 7/1999 | Yamauchi et al. | 123/295 |

FOREIGN PATENT DOCUMENTS

| | | | |
|---|---|---|---|
| 615324 | 1/1949 | United Kingdom | 123/302 |

*Primary Examiner*—Erick Solis
*Attorney, Agent, or Firm*—Arent Fox Kintner Plotkin & Kahn PLLC

[57] ABSTRACT

A gasoline direct-injection engine includes a cavity provided in a top portion of a piston and constituting a portion of a combustion chamber defined between a cylinder head and the top portion of the piston, a fuel injection valve mounted in the cylinder head for injecting gasoline directly into the combustion chamber, and a spark plug also mounted in the cylinder head to face the combustion chamber. In this gasoline direct-injection engine, the fuel injection valve facing a substantially central portion of a ceiling surface of the combustion chamber is mounted in the cylinder head to have an axis substantially parallel to an axis of the piston, and the cavity provided in the top portion of the piston and disposed below the fuel injection valve and the spark plug is defined so that it is deeper in an area corresponding to the spark plug than in an area corresponding to the fuel injection valve. Thus, it is possible to achieve a stable lean laminar burn in wide ranges of rotational speed and load of the engine, thereby providing an improvement in fuel consumption and an enhancement in nature of an exhaust gas.

8 Claims, 14 Drawing Sheets

GASOLINE DIRECT-INJECTION ENGINE

BACKGROUND OF THE INVENTION

1. FIELD OF THE INVENTION

The present invention relates to a gasoline direct-injection engine including a cavity provided in a top portion of a piston and forming a portion of a combustion chamber defined between a cylinder head and the top portion of the piston, a fuel injection valve mounted in the cylinder head for injecting gasoline directly into the combustion chamber, and a spark plug also mounted in the cylinder head to face the combustion chamber.

2. DESCRIPTION OF THE RELATED ART

A gasoline direct-injection engine shown in FIG. 14 and a gasoline direct-injection engine shown in FIG. 15 are conventionally known. In the gasoline direct-injection engine shown in FIG. 14, a fuel injecting valve 22 with its axis inclined with respect to the axis of a piston $13_4$ is mounted in a cylinder head 14 to be able to inject gasoline into a cavity $21_1$ provided in a top portion of the piston $13_4$, and a spark plug 23 is mounted in the cylinder head 14 in such a manner that its front end faces into a flow of gasoline injected from the fuel injection valve 22. Before an air-gasoline mixture is uniformized within the combustion chamber $15_1$, the gasoline can be burned by igniting the gasoline injected from the fuel injection valve 22, thereby enabling a lean laminar burn. In the gasoline direct-injection engine shown in FIG. 15, a fuel injection valve 22 facing a side of a combustion chamber $15_2$ is mounted in a cylinder head 14 to have its axis inclined with respect to the axis of a piston $13_5$, and a spark plug 23 is mounted in the cylinder head 14 to face a substantially central portion of a ceiling surface of the combustion chamber $15_2$. A cavity $21_2$ is provided in a top portion of the piston $13_5$ and has a shape permitting gasoline to be guided to a portion around the spark plug 23 by the penetration of gasoline injected from the fuel injection valve 22 and by a swirl flow generated within the combustion chamber $15_2$. Thus, it is possible to achieve a lean burn by injecting the gasoline from the fuel injection valve 22 in the later portion of a compression stroke.

In an engine designed to ignite gasoline, which is being injected from the fuel injection valve 22, by a spark ignition provided by the spark plug 23 as in the gasoline direct-injection engine shown in FIG. 14, however, the vaporization of the gasoline and the mixing of the gasoline with air in the combustion chamber $15_1$ are insufficient. Therefore, it is difficult to provide a stable ignition by a usual igniting system and hence, a multiplex ignition is required, and problems arise such as a complication of the igniting system, an increase in cost, and wear in electrodes of the spark plug. In addition, due to an insufficient mixing of the gasoline and air, a smoke is liable to be produced, and the amount of unburned gasoline discharged is relatively large, thereby bringing about a deterioration in the nature of an exhaust gas. Further, the burning period is prolonged to make it difficult to improve the fuel consumption, and a stable lean laminar burn cannot be performed in wide ranges of rotational speed and load of the engine.

In the gasoline direct-injection engine shown in FIG. 15, the combustible air-gasoline mixture is collected to a portion near the spark plug 23 by virtue of the shape of the cavity $21_2$ and by the swirl flow within the combustion chamber $15_2$, so that a laminar burn is carried out. Therefore, the timing of injection by the fuel injection valve 22 is limited and for this reason, it is impossible to perform a stable lean laminar burn in wide ranges of rotational speed and load of the engine. When an early injection is carried out by the fuel injection valve 22 in a full-load operation or the like in order to provide a uniform air-gasoline mixture, the injected gasoline is liable to be deposited to a cylinder wall surface on the side opposite to the fuel injection valve, and there is a possibility that a deterioration in engine lubricating oil, a degradation in durability of an engine body and a deterioration in the nature of an exhaust gas may be brought about.

SUMMARY OF THE INVENTION

Accordingly, it is an object of the present invention to provide a gasoline direct-injection engine, wherein a stable lean laminar burn can be achieved in wide ranges of rotational speed and load of the engine, thereby improving the fuel consumption and enhancing the nature of an exhaust gas.

To achieve the above object, according to a first aspect and feature of the present invention, there is provided a gasoline direct-injection engine comprising a cavity provided in a top portion of a piston and constituting a portion of a combustion chamber defined between a cylinder head and the top portion of the piston, a fuel injection valve mounted in the cylinder head for injecting gasoline directly into the combustion chamber, and a spark plug also mounted in the cylinder head to face the combustion chamber, wherein the fuel injection valve faces a substantially central portion of a ceiling surface of the combustion chamber and has an axis substantially parallel to an axis of the piston, and the cavity is disposed below the fuel injection valve and the spark plug and is defined so that the cavity is deeper in an area corresponding to the spark plug than in an area corresponding to the fuel injection valve.

With such arrangement, gasoline injected from the fuel injection valve having the axis substantially parallel to the axis of the piston is injected directly into the cavity in the piston disposed below the fuel injection valve, and an air-gasoline mixture forms a vertical swirl within the cavity, whereby the mixture of the evaporated gasoline and air in a good stratified state is retained within the cavity. Moreover, since the cavity is defined deeper in the area corresponding to the spark plug than in the area corresponding to the fuel injection valve, the combustible mixture is retained within the cavity for a longer period of time, whereby a stable ignition by a usual igniting system which does not require a multiplex ignition can be achieved. Thus, it is possible to perform a stable lean laminar burn in wide ranges of rotational speed and load of the engine to improve the fuel consumption and enhance the nature of an exhaust gas.

According to a second aspect and feature of the present invention, in addition to the arrangement of the first feature, the cavity is provided in such a manner that the center of the cavity is disposed between a first position corresponding to the fuel injection valve and a second position corresponding to the spark plug on a first straight line connecting the first and second positions, the cavity having a bottom surface formed so that in a direction along the first straight line the bottom surface is inclined and deeper toward the second position. With such arrangement, a mixture of gasoline injected from the fuel injection valve into the cavity and air can be collected toward the spark plug to ensure a more reliable ignition, thereby providing a good combustion stability and a reduction in fuel consumption.

According to a third aspect and feature of the present invention, in addition to the arrangement of the second feature, a third position is established in which the first straight line intersects an inner circumference of the cavity on a side of the second position opposite to the center of the cavity; a fourth position is established on the inner circumference of the cavity at a location upstream of the third position by a predetermined deviation angle equal to or smaller than 90 degrees in a direction of flow of a swirl formed within the combustion chamber; and the bottom surface of the cavity is formed so that on a second straight line (L2) passing the center of the cavity and the fourth portion, the depth of the cavity is larger toward the fourth position, but smaller when going away from the second straight line(L2) to opposite sides of the second straight line.

With such arrangement of the third feature, the mixture within the cavity can be guided toward the fourth position along the second straight line, and the mixture rising along the inner surface of the cavity in the fourth position can be caused to flow toward the spark plug by the swirl produced within the combustion chamber, so that the ignition by the spark plug can be more reliably achieved. Thus, it is possible to provide a further enhancement in combustion stability and further provide a reduction in fuel consumption.

According to a fourth aspect and feature of the present invention, in addition to the arrangement of the third feature, the bottom surface of the cavity is formed so that the depth of the cavity is the smallest at a position in which the second straight line intersects the inner circumference of the cavity on a side opposite to the fourth position. With the fourth feature, the mixture within the cavity can be effectively guided toward the fourth position along the second straight line, thereby further effectively providing an enhancement in combustion stability and a reduction in fuel consumption.

Further, according to a fifth aspect and feature of the present invention, in addition to any one of the first to fourth features, the piston comprises a piston body and a cavity defining member for defining the cavity, which are coupled to each other to thermally insulate the inner surface of the cavity and the piston body from each other. With such arrangement, the inner surface of the cavity can be maintained at a relatively high temperature, whereby the vaporization of the gasoline within the combustion chamber can be further promoted to provide an enhancement in combustion efficiency, thereby realizing a further stable lean burn.

The above and other objects, features and advantages of the invention will become apparent from the following description of the preferred embodiments taken in conjunction with the accompanying drawings.

BRIEF DESCRIPTION OF THE DRAWINGS

FIGS. 1 to 9 show a first embodiment of the present invention, wherein

FIG. 1 is a vertical sectional view of an essential portion of a gasoline direct-injection engine, taken along a line 1—1 in FIG. 2;

FIG. 2 is a plan view of a piston;

FIG. 3 is a vertical sectional view of an essential portion of the piston taken along a line 3—3 in FIG. 2;

FIG. 4 is a vertical sectional view of an essential portion of the piston taken along a line 3—3 in FIG. 2;

FIG. 5 is a diagram showing the variation in depth of a cavity in a circumferential direction;

FIG. 6 is a diagram showing the characteristic of variation in fuel consumption rate with respect to the net work;

FIG. 7 is a diagram showing the characteristic of variation in smoke generation rate with respect to the rotational speed of the engine;

FIG. 8 is a diagram showing the characteristic of variations in combustion variation rate and fuel consumption rate with respect to the inclination angle of the bottom surface of the cavity;

FIG. 9 is a diagram showing the characteristic of variations in combustion variation rate and fuel consumption rate with respect to the deviation angle;

DETAILED DESCRIPTION OF THE PREFERRED EMBODIMENTS

Figure 1:
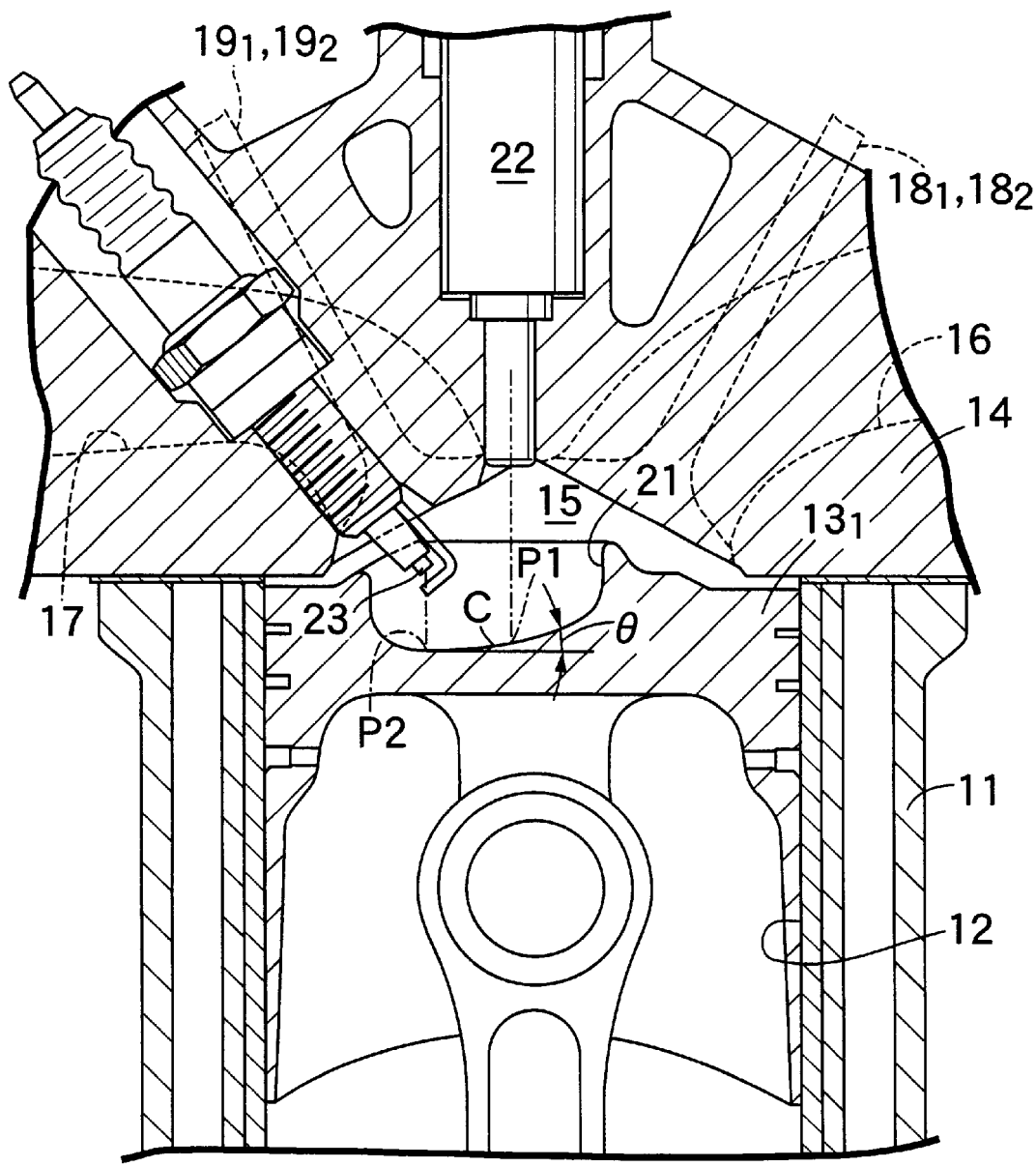

The present invention will now be described by way of embodiments with reference to the accompanying drawings.

A first embodiment of the present invention will first be described with reference to FIGS. 1 to 9. Referring to FIGS. 1 to 4, a combustion chamber 15 is defined between a top portion of a piston $13_1$ slidably fitted in a cylinder bore 12 provided in a cylinder block 11 and a cylinder head 14 coupled to the cylinder block 11. An intake port 16 and an exhaust port 17 are provided for each of the cylinder bores 12 in the cylinder head 14 so as to open into opposite sides of the cylinder head 14.

A pair of intake valves $18_1$ and $18_2$ are disposed in the cylinder head 14 for switching over the fluid connection and disconnection between the combustion chamber 15 and the intake port 16, and a pair of exhaust valves $19_1$ and $19_2$ are also disposed in the cylinder head 14 for switching over the fluid connection and disconnection between the combustion chamber 15 and the exhaust port 17. A valve operating mechanism (not shown) for opening and closing the intake valves $18_1$ and $18_2$ is capable of opening and closing one $18_1$ of the intake valves $18_1$ and $18_2$, but stopping the other intake valve $18_2$ to form a swirl in a direction of flow indicated by an arrow 20 in FIG. 2 within the combustion chamber 15.

A circular cavity 21 constituting a portion of the combustion chamber 15 is provided in the top portion of the piston $13_1$ to occupy, for example, 23 to 25% of the volume of the combustion chamber 15 at a top dead center of the piston $13_1$. A fuel injection valve 22 having an axis substantially parallel to an axis of the piston $13_1$ is mounted in the cylinder head 14 to be able to inject gasoline directly into the combustion chamber 15, so that it faces a substantially central portion of a ceiling surface of the combustion chamber 15. A spark plug 23 having an axis inclined with respect to the axis of the piston $13_1$ is mounted in the cylinder head 14 with its front end protruding the combustion chamber 15, and is disposed between the exhaust valves $19_1$ and $19_2$.

The cavity 21 is provided in the top portion of the piston $13_1$, so that it is disposed below the fuel injection valve 22 and the spark plug 23 and formed deeper in an area corresponding to the spark plug 23 than in an area corresponding to the fuel injection valve 22.

Moreover, the cavity 21 is provided in the top portion of the piston $13_1$, so that the center C thereof is disposed at an intermediate portion between a first position P1 corresponding to the fuel injection valve 22 and a second position P2 corresponding to the spark plug 23 on a first straight line L1 connecting the first and second positions P1 and P2 to each other.

A fourth position P4 is established on an inner circumference of the cavity 21 at a point upstream, by a deviation angle α equal to or smaller than 90 degrees in a direction 20 of flow of the swirl formed within the combustion chamber 15, from a third position P3 in which the first straight line L1 intersects the inner circumference of the cavity 21 on the side opposite to the center C of the cavity 21 with respect to the second position P2. The cavity 21 has a bottom surface formed so that on a second straight line L2 passing through the fourth position P4 and the center C of the cavity 21, the cavity 21 becomes deeper toward the fourth position P4, but becomes shallower when going away from the second straight line L2 toward opposite sides of the line L2.

Figure 2:
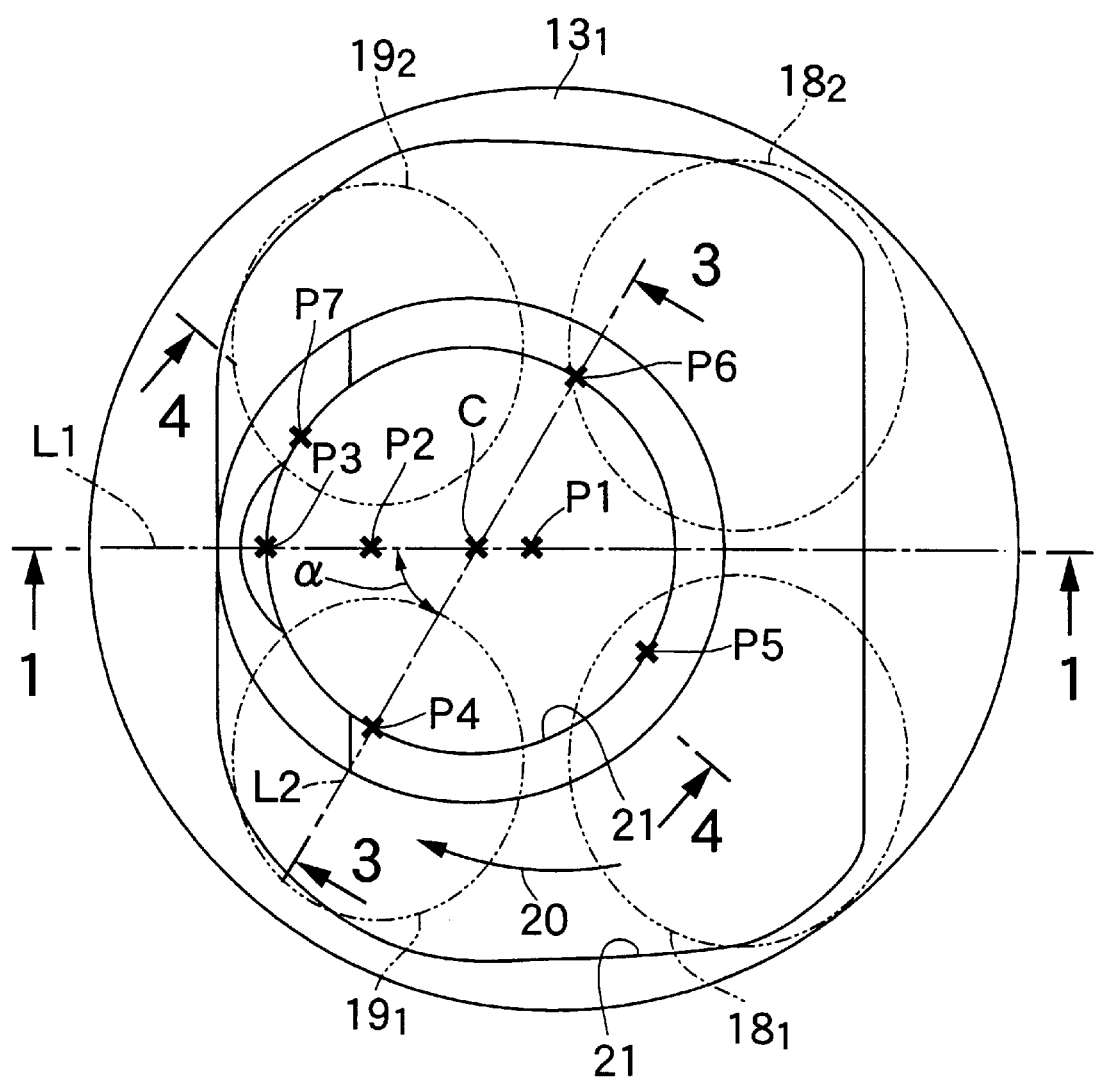
Figure 3:
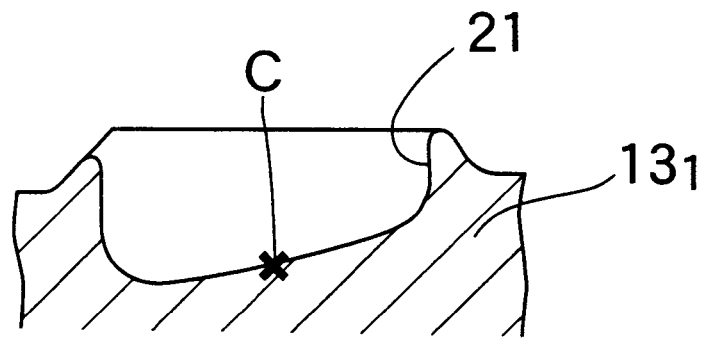
Figure 4:
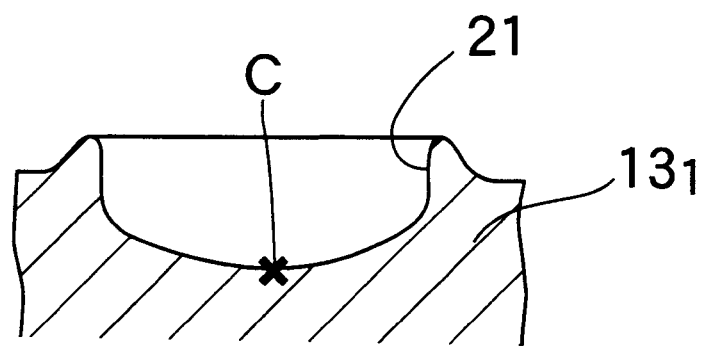
Figure 5:
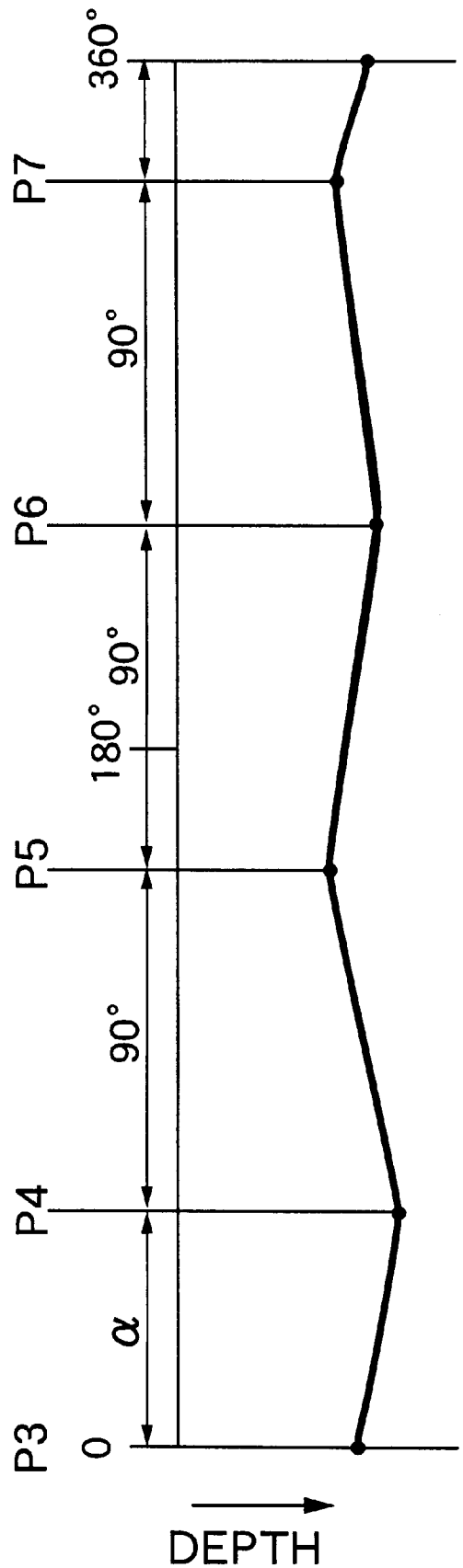

The depth of the inner circumference of the cavity 21 is varied in the circumferential direction as shown in FIG. 5, so that the depth is the largest at a position displaced by the deviation angle α in a counterclockwise direction in FIG. 2 from the third position P3, i.e., at the fourth position P4; the smallest at a fifth position P5 displaced by 90 degrees in the counterclockwise direction in FIG. 2 from the fourth position P4; smaller at a sixth position P6 displaced by 90 degrees in the counterclockwise direction in FIG. 2 from the fifth position P5, i.e., at a position opposite to the fourth position P4 on the second straight line L2, than at the fourth position P4; and also the smallest at a seventh position P7 displaced by 90 degrees in the counterclockwise direction in FIG. 2 from the sixth position P6, similarly as at the fifth position P5.

With such shape of the bottom surface of the cavity 21, the bottom surface of the cavity in a section taken along the first straight line L1 is formed to be inclined at an inclination angle θ, so that the cavity is deeper at a location closer to the second position P2, as shown in FIG. 1.

The operation of the first embodiment will be described below. The fuel injection valve 22 facing the substantially central portion of the ceiling surface of the combustion chamber 15 is mounted in the cylinder head 14 to have the axis substantially parallel to the axis of the piston $13_1$, and the cavity 21 is provided in the top portion of the piston $13_1$ and disposed below the fuel injection valve 22 and the spark plug 23. Therefore, the gasoline injected from the fuel injection valve 22 is injected directly into the cavity 21, where a mixture of the gasoline and air forms a vertical swirl. The mixture of the vaporized gasoline and air in a good stratified state is retained within the cavity 21 and ignited by the spark plug 23. Moreover, because the cavity 21 is formed deeper in the area corresponding to the spark plug 23 than in the area corresponding to the fuel injection valve 22, the combustible mixture can be retained within the cavity for a longer period of time, whereby the stable ignition can be achieved by a usual igniting system which does not require a multiplex ignition, and the lean laminar combustion which is stable in a wide range of engine rotational speed and load can be achieved, while increasing the degree of freedom of the injection timing provided by the fuel injection valve 22. Thus, it is possible to improve the fuel consumption and enhance the nature of an exhaust gas.

Figure 6:
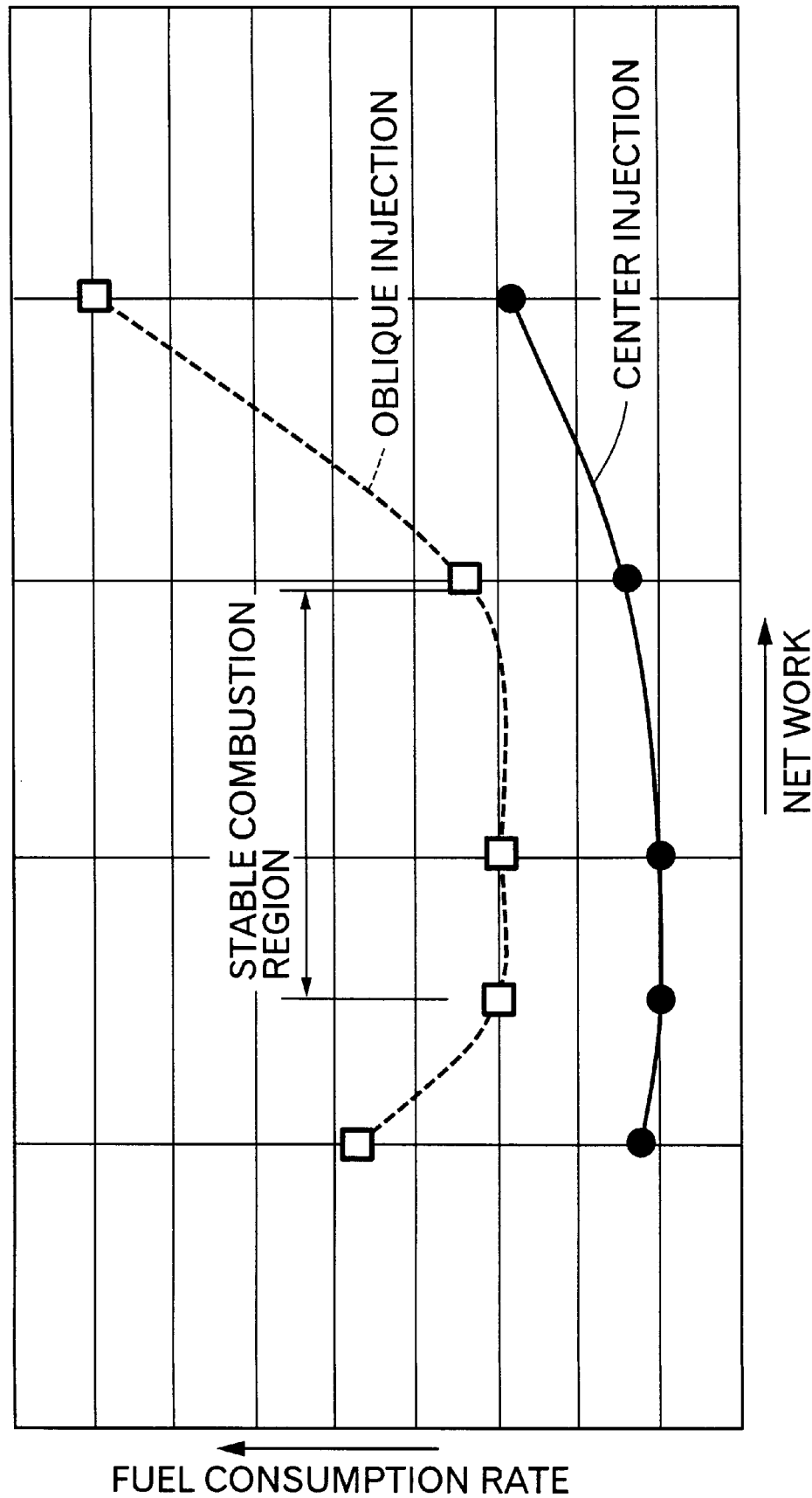
Figure 7:
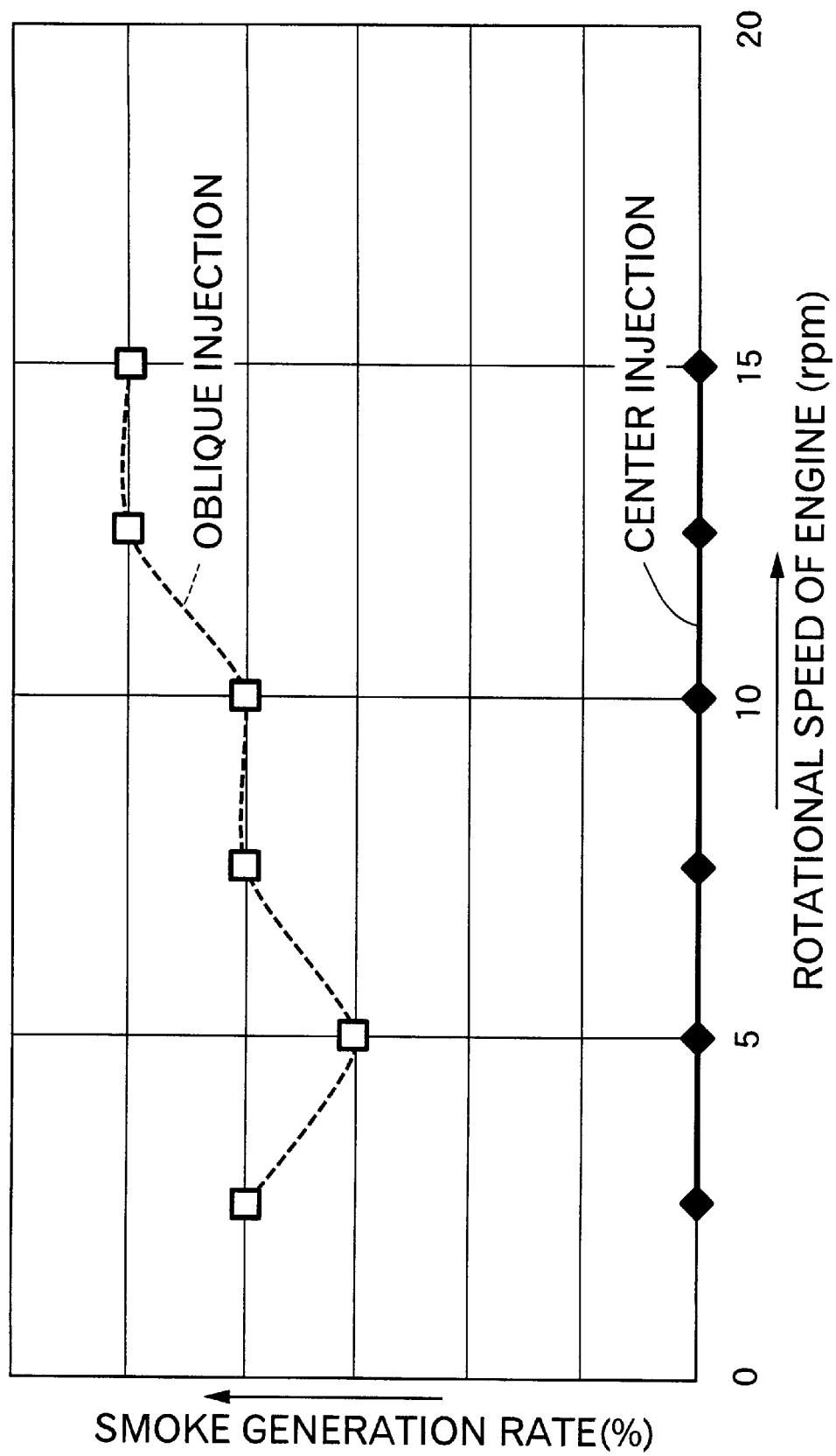
Figure 14:
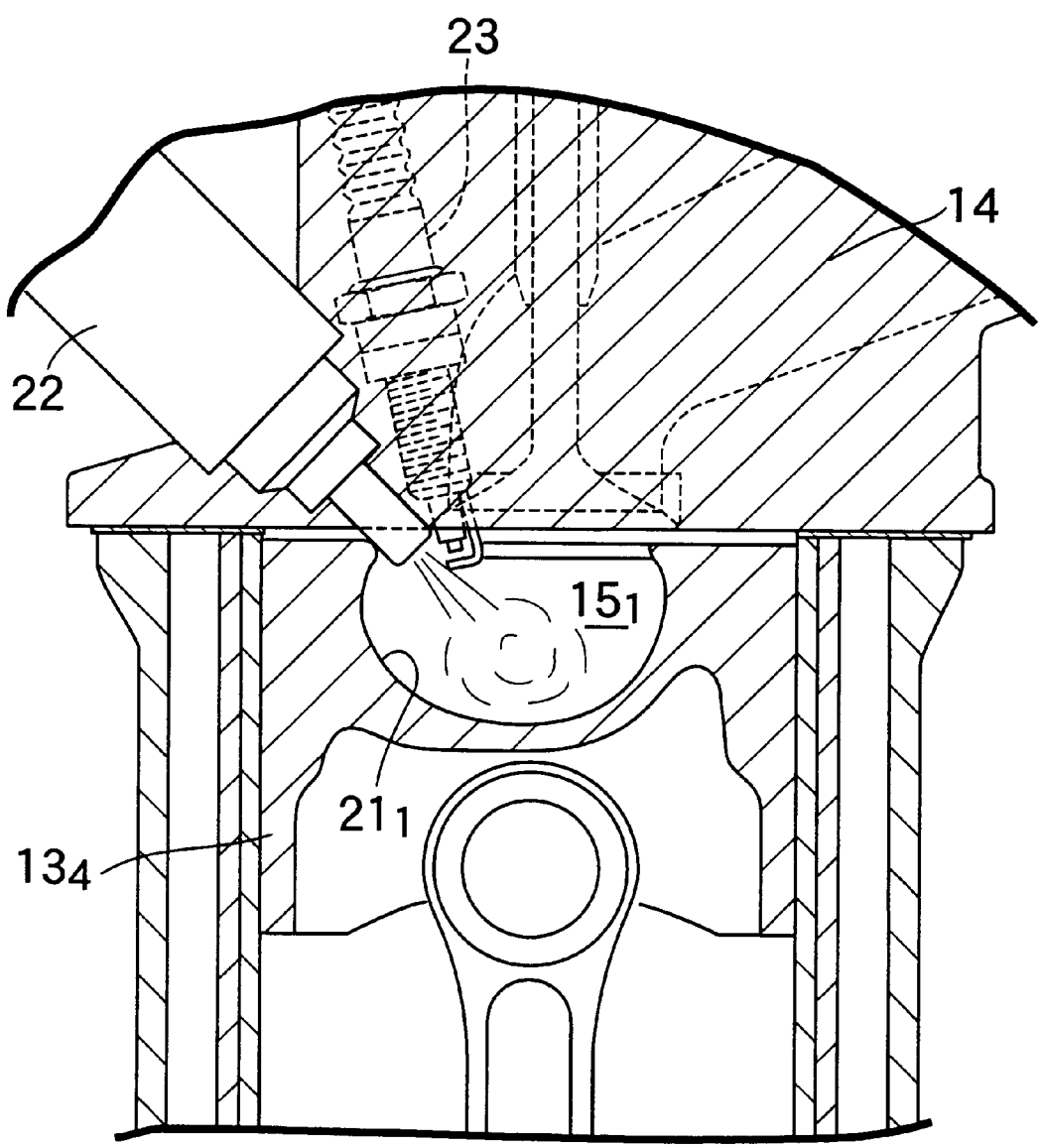
FIG. 14 is a vertical sectional view of an essential portion of a gasoline direct-injection engine as one conventional example.
Figure 15:
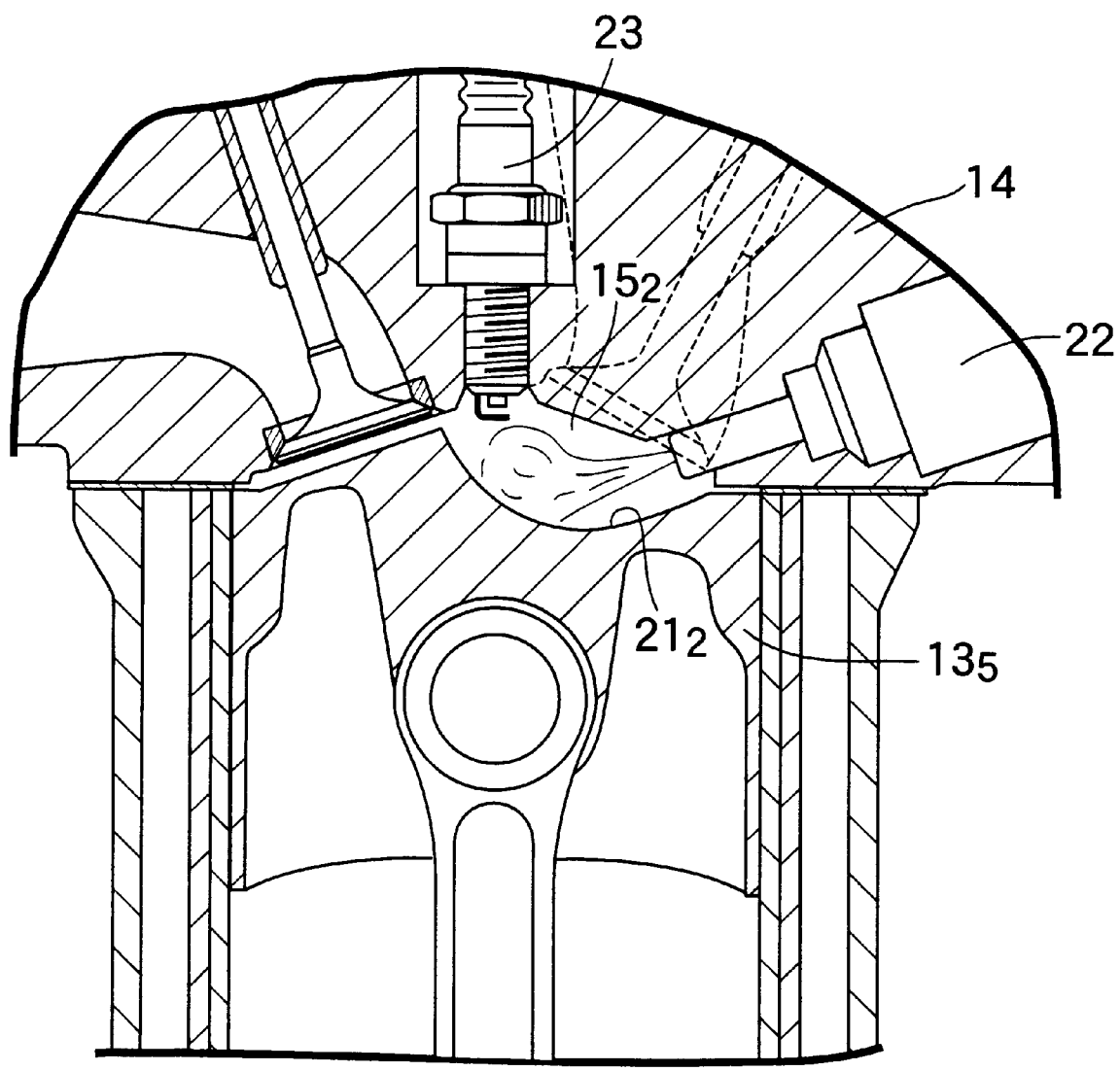
FIG. 15 is a vertical sectional view of an essential portion of a gasoline direct-injection engine as another conventional example.

If the variations in fuel consumption rates with respect to a net work are compared with each other between in the oblique injection in the prior art shown in FIGS. 14 and 15 and in the injection of the gasoline into the combustion chamber 15 (in the center injection) by the fuel injection valve 22 provided in an upright state according to the present invention, these variations are as shown in FIG. 6. As apparent from FIG. 6, it can be seen that the fuel consumption rate can be reduced to a lower level in the center injection than in the oblique injection. If variations in rates of generation of smoke with respect to the rotational speed of the engine are compared with each other between in the oblique injection in the prior art and the center injection according to the present invention, these variations are as shown in FIG. 7. As apparent from FIG. 7, it can be seen that the rate of generation of smoke can be suppressed to approximately "0" in the center injection, and on the other hand, the generation of smoke cannot be avoided in the oblique injection.

The cavity 21 is provided in the top portion of the piston $13_1$ in such a manner that the center C of the cavity 21 is disposed in the middle between the first position P1 corresponding to the fuel injection valve 22 and the second position P2 corresponding to the spark plug 23 on the first straight line L1 connecting the first and second positions P1 and P2 to each other, and the bottom surface of the cavity in the direction of the first straight line L1 is formed in such a manner it is inclined, for example, at the inclination angle θ, so that the cavity is deeper at a location closer to the second position P2. Therefore, the air-gasoline mixture injected from the fuel injection valve 22 into the cavity 21 can be collected toward the spark plug 23 and reliably ignited. Thus, it is possible to provide a good combustion stability and a reduction in fuel consumption.

Figure 8:
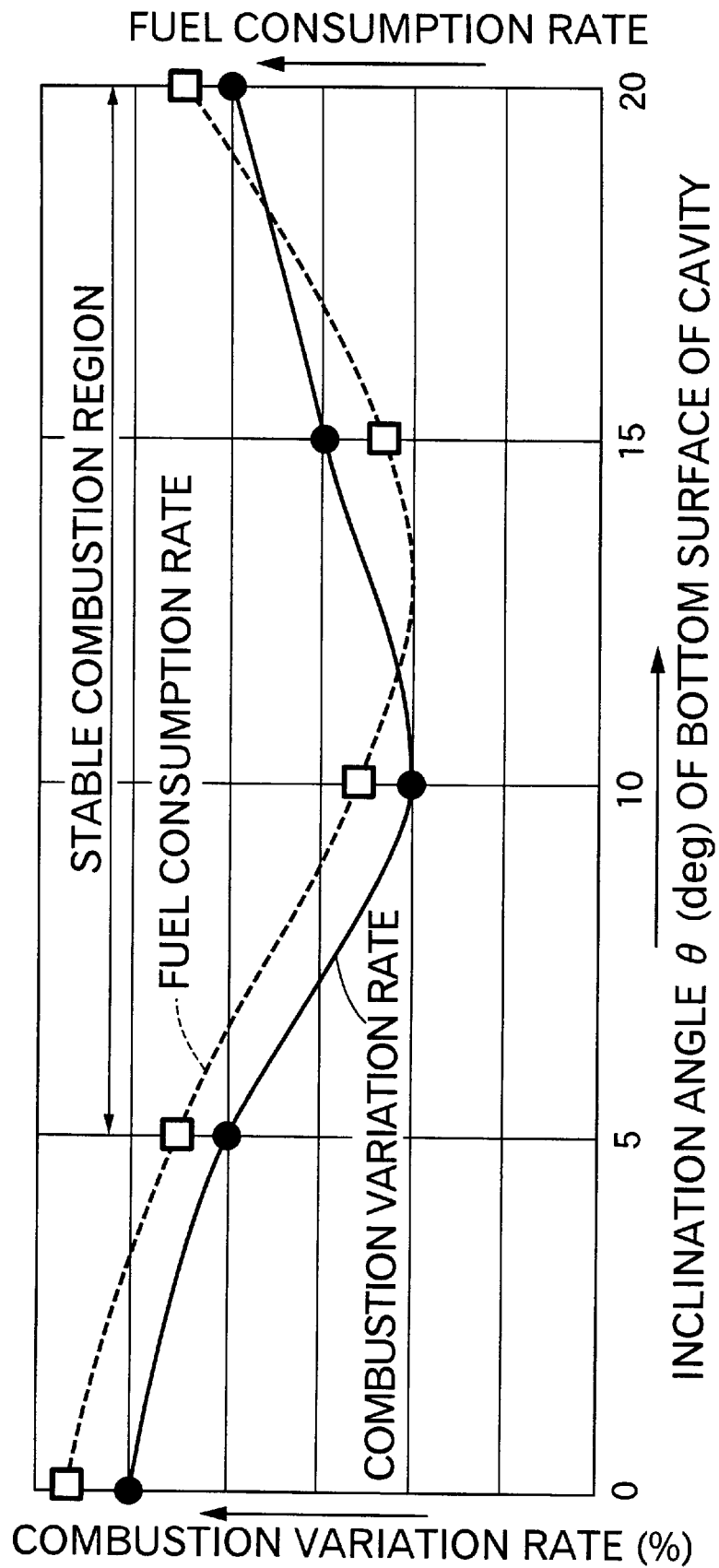

Here, when the inclination θ is varied, the rate of variation in combustion and the fuel consumption rate are varied as shown in FIG. 8. It is desired that the inclination angle θ is set in a range of 5 to 20 degrees for a stable combustion region.

Further, the third position P3 in which the first straight line L1 intersects the inner circumference of the cavity 21 on the side opposite to the center of the cavity 21 with respect to the second position P2, and the fourth position P4 is established on the inner circumference of the cavity 21 at the location upstream by the predetermined deviation angle α equal to or smaller than 90 degrees in the direction of flow of the swirl formed within the combustion chamber 15 from the third position P3. The cavity 21 has the bottom surface formed so that on the second straight line L2 passing through the center C of the cavity 21 and the fourth position P4, the cavity 21 becomes deeper toward the fourth position P4, but becomes shallower when going away from the second straight line L2 toward opposite sides of the line L2.

Therefore, the mixture in the cavity 21 can be guided to the fourth position P4 along the second straight line L2, and the mixture rising along an inner surface of the cavity in the fourth position P4 can be caused to flow toward the spark plug 23 by the swirl produced within the combustion chamber 15, whereby the ignition of the mixture by the spark plug 23 can be reliably achieved. Thus, it is possible to provide a further enhancement of the combustion stability and a further reduction in fuel consumption.

Figure 9:
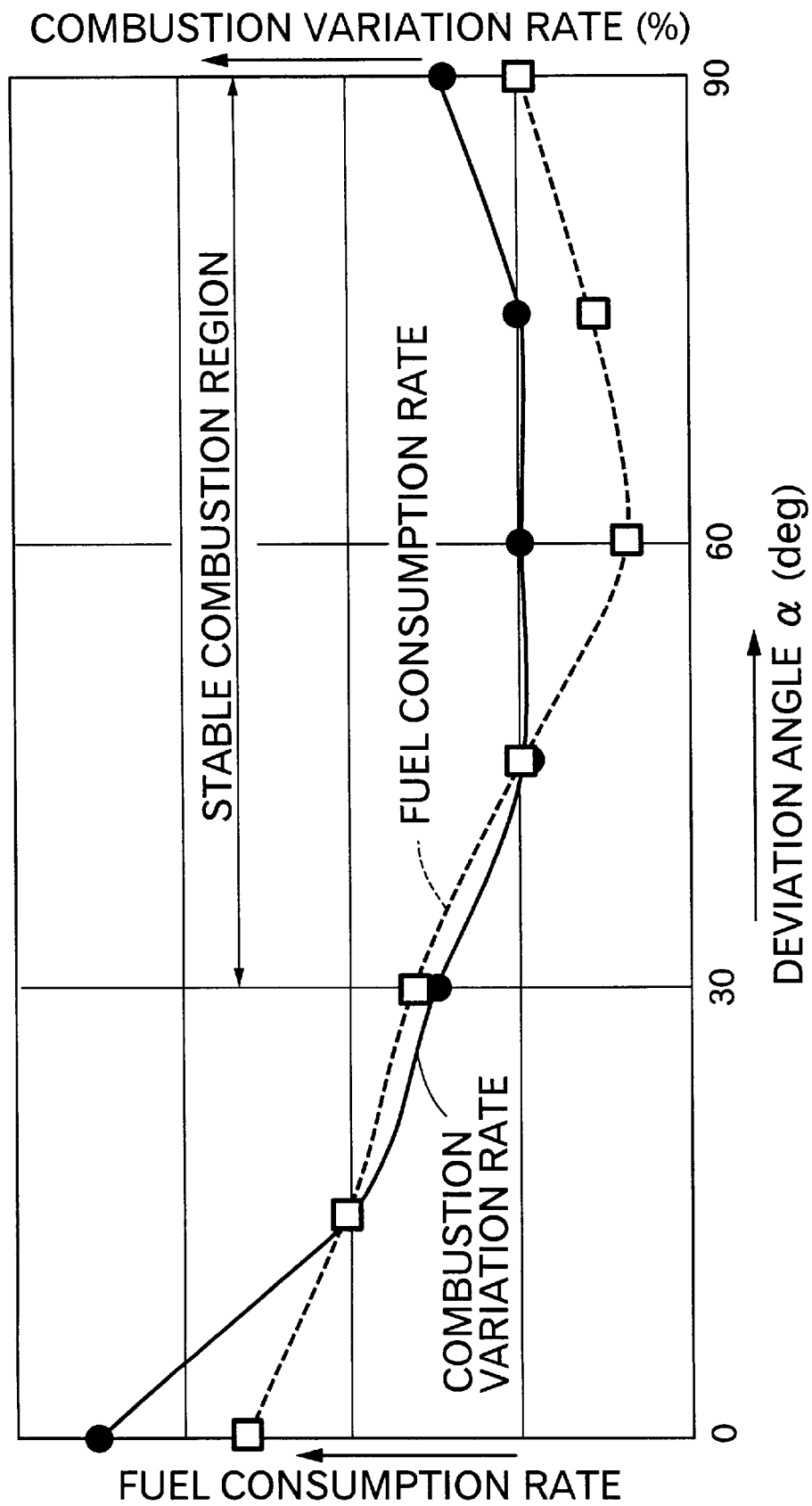

Here, when the deviation angle α is varied, the combustion variation rate and the fuel consumption rate are varied as shown in FIG. 9. It is desired that the deviation angle α is set in a range of 30 to 90 degrees for a stable combustion region.

Figure 10:
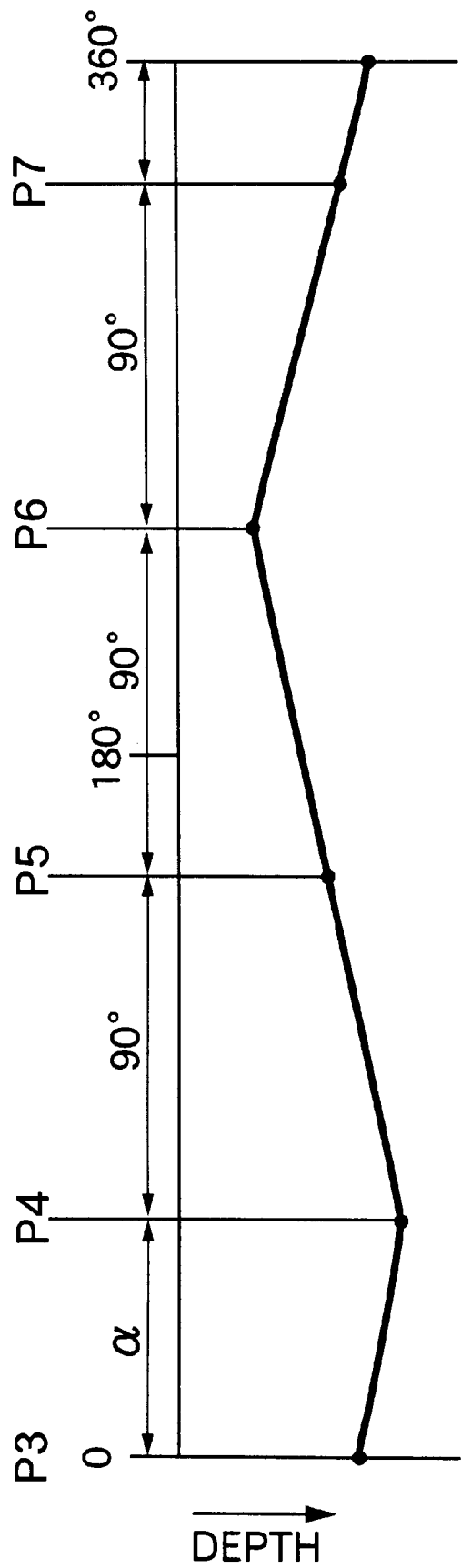
FIG. 10 is a diagram showing the variation in depth of a cavity in a circumferential direction in a second embodiment.

In a second embodiment of the present invention, the depth of the inner circumference of the cavity 21 may be set as that it is varied in a circumferential direction as shown in FIG. 10. More specifically, the depth of the inner circumference of the cavity 21 is the largest in a position displaced by the deviation angle α in a counterclockwise direction in FIG. 10 from a third position P3 in which a first straight line L1 connecting a first position P1 corresponding to the fuel injection valve 22 and a second position P2 corresponding to the spark plug 23 intersects the inner circumference of the cavity 21 on the side opposite to the center C of the cavity 21 with respect to the second position P2, i.e., at a fourth position P4, and is smaller at a fifth position P5 displaced by 90 degrees in the counterclockwise direction in FIG. 10 from the fourth position P4, than at the fourth position P4. The depth of the inner circumference is the smallest at a sixth position P6 displaced by 90 degrees in the counterclockwise direction in FIG. 10 from the fifth position P5, i.e., at a position on the side opposite to the fourth position P4 on a second straight line L2, and is smaller at a seventh position displaced by 90 degrees in the counterclockwise direction in FIG. 10 from the sixth position P6 than at the fourth position P4.

According to the second embodiment, a mixture within the cavity 21 can be more effectively guided toward the fourth position P4 along the second straight line L2 and thus, it is possible to further effectively enhance the fuel stability and reduce fuel consumption.

Figure 11:
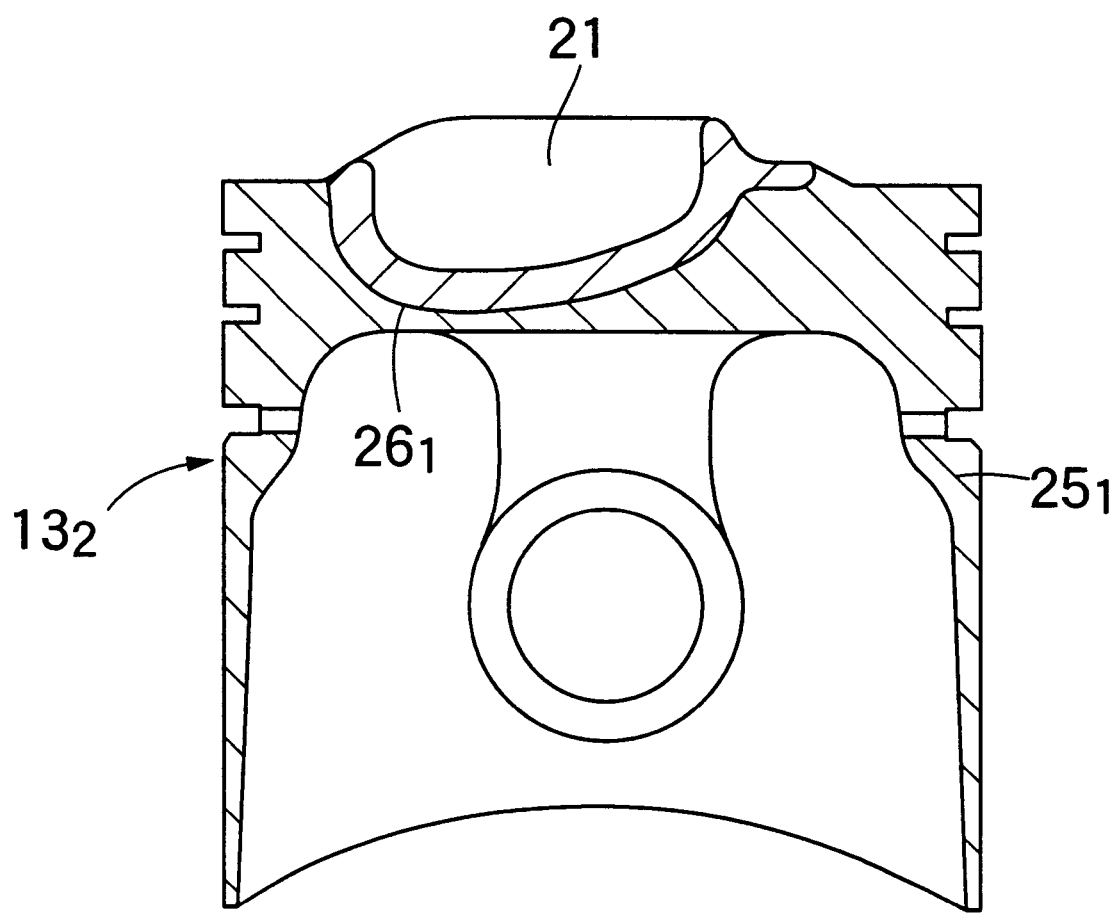
FIG. 11 is a vertical sectional view of a piston in a third embodiment.
Figure 12:
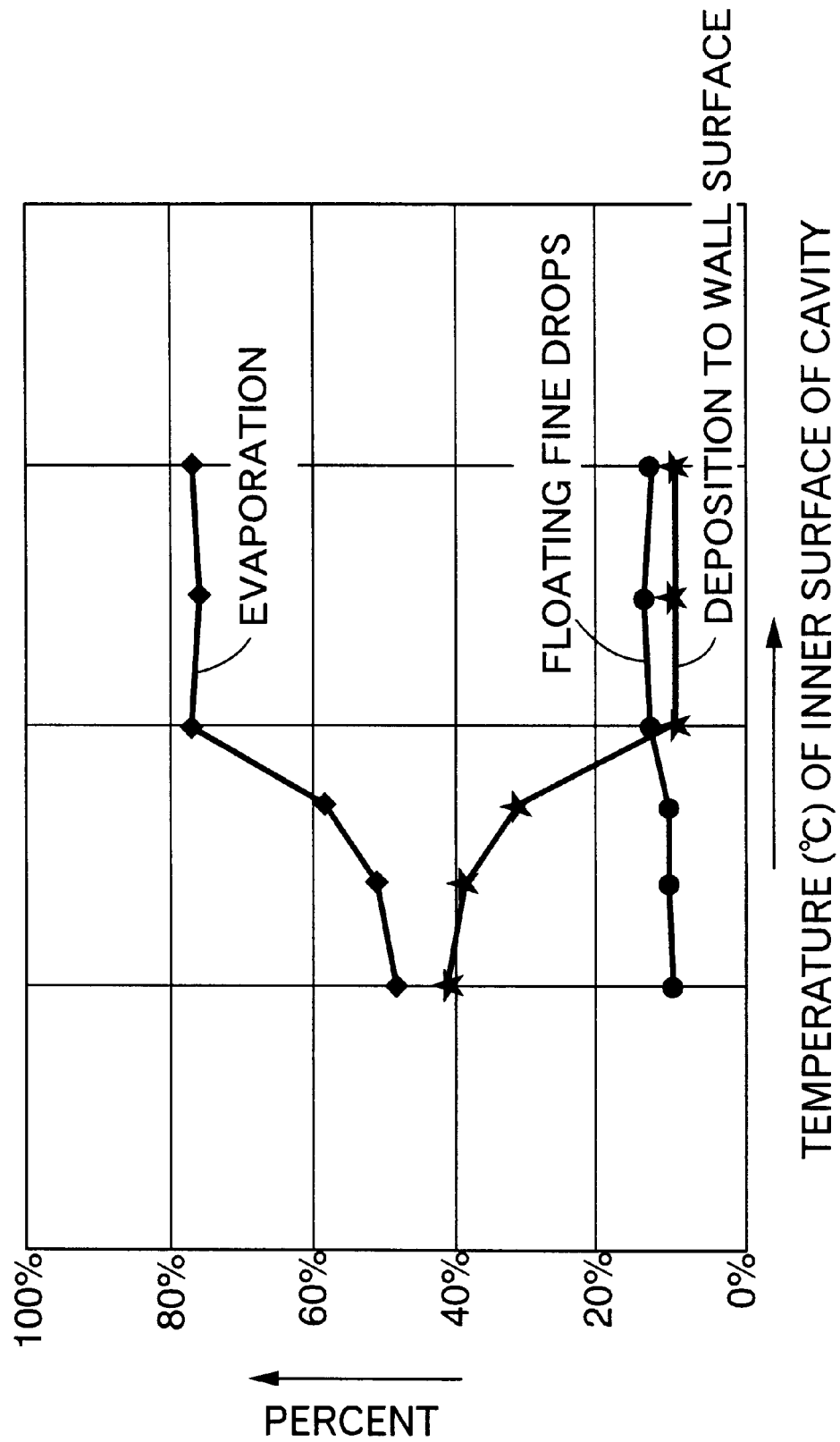
FIG. 12 is a diagram showing the variations in amount of gasoline evaporated, amount of floating fine drops of gasoline and amount of gasoline deposited on a wall surface.

FIG. 11 shows a third embodiment of the present invention. A piston $13_2$ includes a cavity defining member $26_1$ for defining a cavity 21, which member is integrally coupled to a top portion of a piston body $25_1$ slidably fitted in a cylinder bore 12 (see FIG. 1). The cavity defining member $26_1$ is formed from a metal material having a heat conductivity lower than that of a metal material forming the piston body $25_1$.

More specifically, the piston $13_2$ includes the piston body $25_1$ and the cavity defining member $26_1$ for defining the cavity 21, which are coupled to each other with an inner surface of the cavity 21 and the piston body $25_1$ being thermally insulated from each other.

According to the third embodiment, the inner surface of the cavity 21 can be maintained at a relatively high temperature, and the vaporization of the gasoline within a combustion chamber 15 (see FIG. 1) can be further promoted to provide an enhancement in combustion efficiency, thereby realizing a further stable lean burn. In other words, as the temperature of the inner surface of the cavity 21 rises, the amount of fine drops of the gasoline is not varied largely, but the amount of gasoline evaporated within the cavity 21 is increased and the amount of gasoline deposited on a wall surface of the cavity 21 is decreased. Thus, it is possible to provide a further stable lean burn by the thermally insulation between the inner surface of the cavity 21 and the piston body $25_1$.

Figure 13:
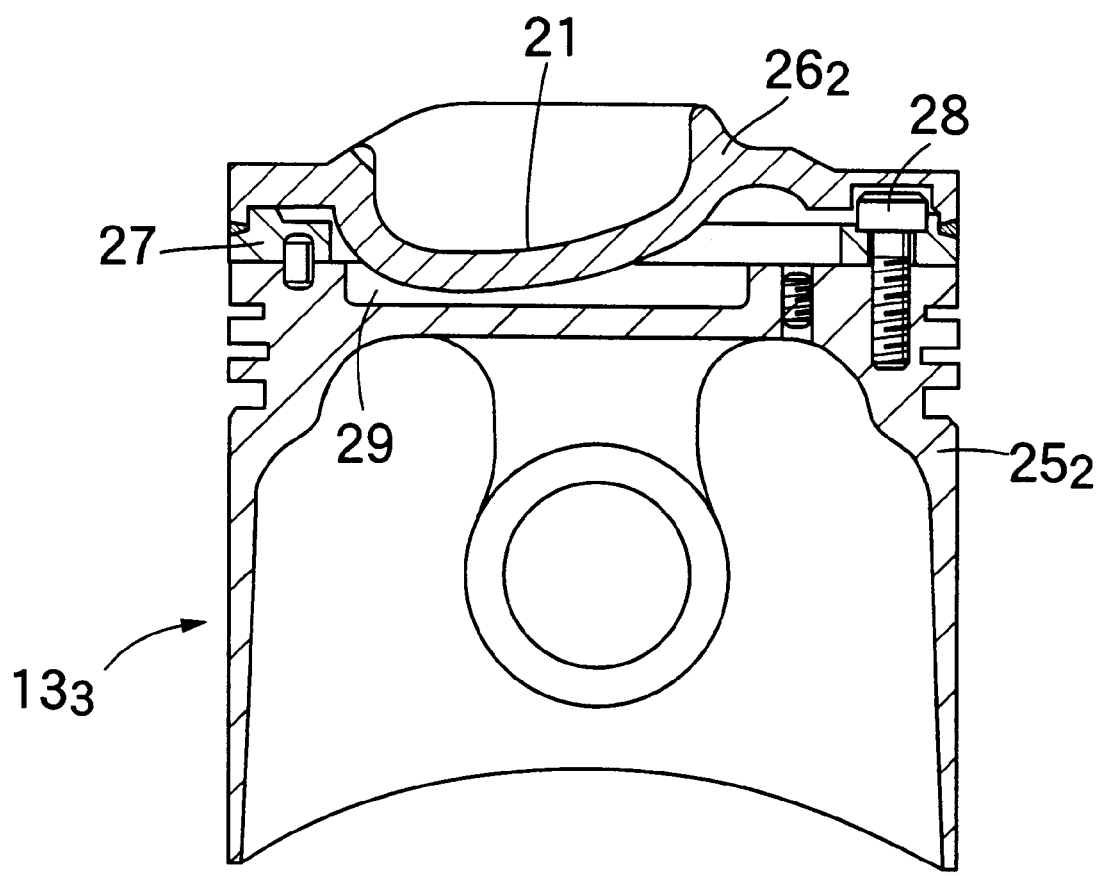
FIG. 13 is a vertical sectional view of a piston in a fourth embodiment.

FIG. 13 shows a fourth embodiment of the present invention. A piston $13_3$ includes a cavity defining member $26_2$ for defining a cavity 21, which member is connected through a connecting ring 27 to a top portion of a piston body $25_2$ slidably fitted in a cylinder bore 12 (see FIG. 1).

The cavity defining member $26_2$ and the connecting ring 27 are formed from the same material as the piston body $25_2$ or a metal material having a heat conductivity lower than that of a metal material which forms the piston body $25_2$. In a state in which the connecting ring 27 has been fastened to the piston body $25_2$ by a single bolt 28 or a plurality of bolts 28, the cavity defining member $26_2$ is welded to the connecting ring 27. Thus, an air heat-insulating layer 29 is formed between the cavity defining member $26_2$ welded to the connecting ring 27 and the piston body $25_2$.

Even according to the fourth embodiment, the piston body $25_2$ and the cavity defining member $26_2$ are coupled to each other to thermally insulate the inner surface of the cavity 21 and the piston body $25_2$ from each other, thereby constituting the piston $13_3$. Thus, it is possible to provide an effect similar to that in the second embodiment.

Although the embodiments of the present invention have been described in detail, it will be understood that the present invention is not limited to the above-described embodiments, and various modifications in design may be made without departing from the spirit and scope of the invention defined in claims.

What is claimed is:

1. A gasoline direct-injection engine comprising a cavity provided in a top portion of a piston and constituting a portion of a combustion chamber defined between a cylinder head and the top portion of said piston, a fuel injection valve mounted in said cylinder head for injecting gasoline directly into said combustion chamber, and a spark plug also mounted in said cylinder head to face said combustion chamber, wherein said fuel injection valve faces a substantially central portion of a ceiling surface of said combustion chamber and has an axis substantially parallel to an axis of said piston, and said cavity is disposed below said fuel injection valve and said spark plug and is defined so that said cavity is deeper in an area corresponding to said spark plug than in an area corresponding to said fuel injection valve, wherein said cavity is provided in such a manner that the center of said cavity is disposed between a first position corresponding to said fuel injection valve and a second position corresponding to said spark plug on a first straight line connecting said first and second positions, said cavity having a bottom surface formed so that in a direction along said first straight line the bottom surface is inclined and deeper toward said second position, and wherein a third position is established in which said first straight line intersects an inner circumference of said cavity on a side of said second position opposite to the center of said cavity; a fourth position is established on the inner circumference of said cavity at a location upstream of said third position by a predetermined deviation angle (α) equal to or smaller than 90 degrees in a direction of flow of a swirl formed within said combustion chamber; and the bottom surface of said cavity is formed so that on a second straight line passing the center of said cavity and said fourth position, the depth of said cavity is larger toward said fourth position, but smaller when going away from said second straight line to opposite sides of the second straight line.

2. A gasoline direct-injection engine according to claim 1, wherein the bottom surface of said cavity is formed so that the depth of said cavity is the smallest at a position in which said second straight line intersects the inner circumference of said cavity on a side opposite to said fourth position.

3. A gasoline direct-injection engine according to claim 1, wherein said engine has a pair of intake valves and said first straight line passes between said pair of intake valves as seen in a plan view of the engine, and said fourth position is located on a side of the first straight line close to one of the intake valves.

4. A gasoline direct-injection engine according to claim 3, wherein said engine is capable of assuming an operational state in which said one intake valve is opened and closed and the other intake valve is held inoperative.

5. A gasoline direct-injection engine comprising a cavity provided in a top portion of a piston and constituting a portion of a combustion chamber defined between a cylinder head and the top portion of said piston, a fuel injection valve mounted in said cylinder head for injecting gasoline directly into said combustion chamber, and a spark plug also mounted in said cylinder head to face said combustion chamber, wherein said fuel injection valve faces a substantially central portion of a ceiling surface of said combustion chamber and has an axis substantially parallel to an axis of said piston, and said cavity is disposed below said fuel injection valve and said spark plug and is defined so that said cavity is deeper in an area corresponding to said spark plug than in an area corresponding to said fuel injection valve, wherein said piston comprises a piston body and a cavity defining member for defining said cavity, which are coupled to each other to thermally insulate the inner surface of said cavity and said piston body from each other.

6. A gasoline direct-injection engine comprising a cavity provided in a top portion of a piston and constituting a portion of a combustion chamber defined between a cylinder head and the top portion of said piston, a fuel injection valve mounted in said cylinder head for injecting gasoline directly into said combustion chamber, and a spark plug also mounted in said cylinder head to face said combustion chamber, wherein said fuel injection valve faces a substantially central portion of a ceiling surface of said combustion chamber and has an axis substantially parallel to an axis of said piston, and said cavity is disposed below said fuel injection valve and said spark plug and is defined so that said cavity is deeper in an area corresponding to said spark plug than in an area corresponding to said fuel injection valve, wherein said cavity is provided in such a manner that the center of said cavity is disposed between a first position corresponding to said fuel injection valve and a second position corresponding to said spark plug on a first straight line connecting said first and second positions, said cavity having a bottom surface formed so that in a direction along said first straight line the bottom surface is inclined and deeper toward said second position, and wherein said piston comprises a piston body and a cavity defining member for defining said cavity, which are coupled to each other to thermally insulate the inner surface of said cavity and said piston body from each other.

7. A gasoline direct-injection engine comprising a cavity provided in a top portion of a piston and constituting a portion of a combustion chamber defined between a cylinder head and the top portion of said piston, a fuel injection valve mounted in said cylinder head for injecting gasoline directly into said combustion chamber, and a spark plug also mounted in said cylinder head to face said combustion chamber, wherein said fuel injection valve faces a substantially central portion of a ceiling surface of said combustion chamber and has an axis substantially parallel to an axis of said piston, and said cavity is disposed below said fuel injection valve and said spark plug and is defined so that said cavity is deeper in an area corresponding to said spark plug than in an area corresponding to said fuel injection valve, wherein said cavity is provided in such a manner that the center of said cavity is disposed between a first position corresponding to said fuel injection valve and a second position corresponding to said spark plug on a first straight line connecting said first and second positions, said cavity having a bottom surface formed so that in a direction along said first straight line the bottom surface is inclined and deeper toward said second position, and wherein a third position is established in which said first straight line intersects an inner circumference of said cavity on a side of said second position opposite to the center of said cavity; a fourth position is established on the inner circumference of said cavity at a location upstream of said third position by a predetermined deviation angle ($\alpha$) equal to or smaller than 90 degrees in a direction of flow of a swirl formed within said combustion chamber; and the bottom surface of said cavity is formed so that on a second straight line passing the center of said cavity and said fourth position, the depth of said cavity is larger toward said fourth position, but smaller when going away from said second straight line to opposite sides of the second straight line, and wherein said piston comprises a piston body and a cavity defining member for defining said cavity, which are coupled to each other to thermally insulate the inner surface of said cavity and said piston body from each other.

8. A gasoline direct-injection engine comprising a cavity provided in a top portion of a piston and constituting a portion of a combustion chamber defined between a cylinder head and the top portion of said piston, a fuel injection valve mounted in said cylinder head for injecting gasoline directly into said combustion chamber, and a spark plug also mounted in said cylinder head to face said combustion chamber, wherein said fuel injection valve faces a substantially central portion of a ceiling surface of said combustion chamber and has an axis substantially parallel to an axis of said piston, and said cavity is disposed below said fuel injection valve and said spark plug and is defined so that said cavity is deeper in an area corresponding to said spark plug than in an area corresponding to said fuel injection valve, wherein said cavity is provided in such a manner that the center of said cavity is disposed between a first position corresponding to said fuel injection valve and a second position corresponding to said spark plug on a first straight line connecting said first and second positions, said cavity having a bottom surface formed so that in a direction along said first straight line the bottom surface is inclined and deeper toward said second position, and wherein said piston comprises a piston body and a cavity defining member for defining said cavity, which are coupled to each other to thermally insulate the inner surface of said cavity and said piston body from each other.

* * * * *

UNITED STATES PATENT AND TRADEMARK OFFICE
CERTIFICATE OF CORRECTION

PATENT NO. : 6,095,114
DATED : August 1, 2000
INVENTOR(S) : Kaoru Horie et al.

Page 1 of 1

It is certified that error appears in the above-identified patent and that said Letters Patent is hereby corrected as shown below:

<u>Title page,</u>
Item [30], insert -- May 11, 1998 [JP] Japan 10-127767 and April 13, 1999 [JP] Japan 11-104817 --

Signed and Sealed this

Twenty-eighth Day of August, 2001

Attest:

*Nicholas P. Godici*

NICHOLAS P. GODICI
*Attesting Officer*     *Acting Director of the United States Patent and Trademark Office*